United States Patent
Bush et al.

(10) Patent No.: US 7,398,170 B2
(45) Date of Patent: Jul. 8, 2008

(54) SYSTEM FOR TRANSMITTING DYNAMIC DATA

(75) Inventors: Ralph Eugene Bush, Simpsonville, SC (US); Nurettin Tevfik Cankurt, Simpsonville, SC (US); Nishchey Chhabra, Greenville, SC (US); David Anthony Gottler, Greer, SC (US); Jerry Anthony Muolo, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/535,678

(22) Filed: Sep. 27, 2006

(65) Prior Publication Data
US 2008/0077341 A1    Mar. 27, 2008

(51) Int. Cl.
*G06F 19/00* (2006.01)
*G01R 23/00* (2006.01)

(52) U.S. Cl. .......................... 702/77; 702/75

(58) Field of Classification Search ............ 702/72, 702/74, 75, 77, 78, 124, 186, 189
See application file for complete search history.

(56) References Cited

U.S. PATENT DOCUMENTS 6,260,004 B1 *  7/2001  Hays et al. ................ 702/183
6,507,804 B1 *  1/2003  Hala et al. ................. 702/182

OTHER PUBLICATIONS

A Comparative Study of High-Accuracy Frequency Estimation Methods, Ignacio Santamaria, Carlos Pantaleon and Jesus Ibanez, Mechanical Systems and Signal Processing (2000), 14(0), 000-000, doi:10.1006/mssp.2000.1321, available online at http://www.idealibrary.com on IDEAL.

* cited by examiner

*Primary Examiner*—Bryan Bui
(74) *Attorney, Agent, or Firm*—Cantor Colburn LLP

(57) ABSTRACT

Disclosed is a system for transmitting dynamic data over a network to a computer resource, the system including at least one receiver configured to receive dynamic data and convert dynamic data into a digitized sinusoidal signal, and a computing resource configured for communication with the network and configured to receive the digitized sinusoidal signal from the at least one receiver, the computing resource configured to employ a Fast Fourier Transform to convert the digitized sinusoidal signal into output data that includes phase data, amplitude data, and frequency data of the digitized sinusoidal signal, the output data being transmittable over the network in at least one packet.

15 Claims, 2 Drawing Sheets

SYSTEM FOR TRANSMITTING DYNAMIC DATA

FIELD OF THE INVENTION

The disclosure relates generally to a system for transmitting dynamic data, and more particularly to a system for transmitting dynamic data over a network.

BACKGROUND OF THE INVENTION

In the field of industrial equipment monitoring, monitoring components may generate various signals representative of dynamic conditions. The signal-generating components are typically sensors and transducers positioned on or otherwise closely associated with points of interest of the machine systems. The signals are used to analyze the performance of the machine system. Machine systems thus instrumented may include rotary machines, assembly lines, production equipment, material handling equipment, power generation equipment, as well as many other types of machines of varying complexity.

When in raw format, dynamic data pertaining to the dynamic conditions of the machine (and collected by the sensors) consists of very large quantities of information, and therefore has too large a bandwidth for transmittal over a network. Thus, a system that can analyze, extract appropriate information, efficiently pack data and compress the information from the large quantities of dynamic data so it can be transmitted to a remote user over a network is desirable.

BRIEF DESCRIPTION OF THE INVENTION

Disclosed is a system for transmitting dynamic data over a network to a computer resource, the system including at least one receiver configured to receive dynamic data and convert dynamic data into a digitized sinusoidal signal, and a computing resource configured for communication with the network and configured to receive the digitized sinusoidal signal from the at least one receiver, the computing resource configured to employ a Fast Fourier Transform to convert the digitized sinusoidal signal into output data that includes phase data, amplitude data, and frequency data of the digitized sinusoidal signal, the output data being transmittable over the network in at least one packet.

Also disclosed is a method for transmitting dynamic data over a network to a computer resource, the method including receiving dynamic data from at least one source of dynamic data converting the dynamic data into a digitized sinusoidal signal, transmitting the digitized sinusoidal signal to a computing resource, converting the digitized sinusoidal signal to output data via a Fast Fourier Transform, the output data including amplitude data, frequency data, and phase data of the digitized sinusoidal signal, and transmitting the output data in packed and compressed form over the network in at least one packet.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

Figure 1:
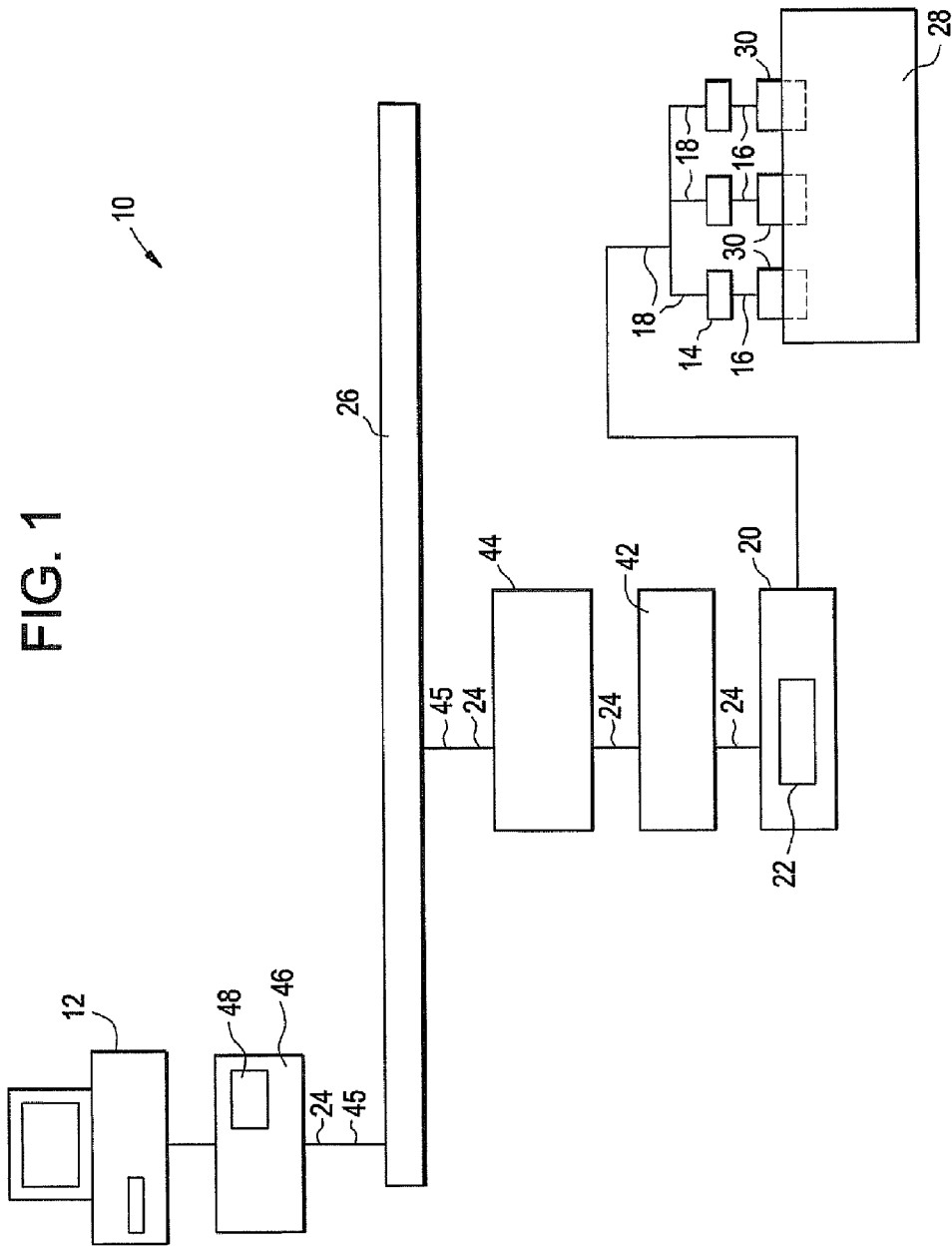
FIG. 1 is a schematic of a system for transmitting dynamic data.

Referring to FIG. 1, a system 10 for transmitting dynamic data to a remote computer resource 12 is illustrated. The system 10 includes at least one receiver 14 for receiving raw dynamic data 16 and converting the raw dynamic data 16 into digitized sinusoidal data 18. The system 10 also includes a computing resource 20 for receiving the digitized sinusoidal data 18, wherein the computing resource 20 employs a Fast Fourier transform 22 that converts the digitized sinusoidal data 18 into output data 24 for eventual transmittal over a network 26.

The dynamic data 16 introduced above originates in at least one source 30, and is ultimately transmitted to the remote computing resource 12 via the system 10. Transmission of the dynamic data 16 from the sources 30 to the remote computer resource 12 via the system 10 will be discussed hereinbelow, beginning with acquisition of the data 16 by the sources 30.

The at least one source 30 of the dynamic data 16 may be any type of sensing system, such as sensors or transducers. The dynamic data 16 may be acquired via the sensing devices/sources 30 from a machine 28 to which the sources 30 are associated. The machine 28 may be of any type, such as a rotary machines, assembly lines, production equipment, material handling equipment, and power generation equipment, wherein the sources 30 acquired dynamic data 16 from the machine 28, which may pertain to operating conditions of the machine 28, such as pressure, vibration, or temperature. When acquired by the sensing devices 30, the dynamic data 16 is in raw, analog form, containing large quantities of information.

Figure 2:
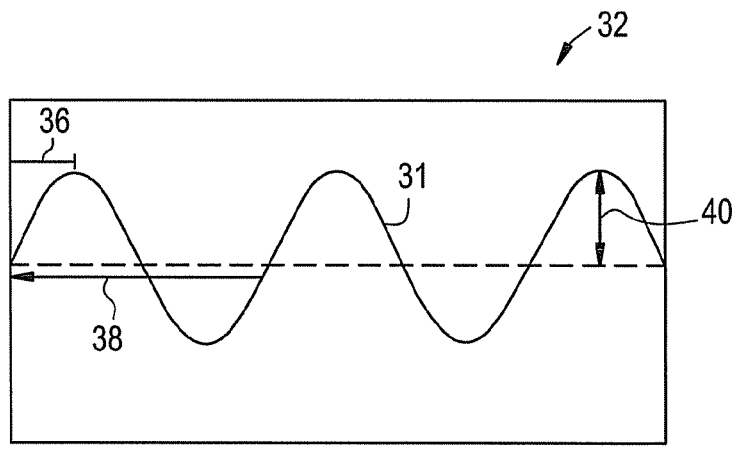
FIG. 2 is a graphic representation of data.

After acquiring the dynamic data 16 in analog form, the sensing devices 30 transmit the data 16 to the receiver 14. The receiver 14 receives the dynamic data 16 in analog form, and converts it into the digitized sinusoidal data 18, which is representable in the form of a digitized sinusoidal signal 31 shown in the graph 32 of FIG. 2. Though FIG. 2 shows a sinusoidal representation measuring pressure (p) over time (t), the graph 32 may measure any condition of the machine 28. It should be appreciated that the receiver 14 may be any type of analog-digital converter configured for communication with the sensing devices 30 via electrical, electromagnetic, or fiber-optical connection.

Also configured for communication (via electrical, electromagnetic, or fiber-optical connection) with the receiver 14 is the computing resource 20, to which digitized sinusoidal data 18 is transmitted from the receiver 14. As mentioned above, the computing resource 20 includes a Fast Fourier Transform (FFT) 22, which may be contained on Microsoft™ compatible computer software, available from Microsoft Corporation) associated with the computing resource 20. An FFT is an algorithm for computing a Fourier transform (a technique for expressing waveform as a weighted sum of sines and cosines) of a set of discrete values. Given a finite set of data points, such as a periodic sampling from a real world signal, the FFT 22 expresses the data in terms of its component frequencies. It also solves the essentially identical inverse problem of reconstructing the real word signal from the frequency data, as will be discussed later in the disclosure. Referring to the waveform, digitized sinusoidal signal 31 of FIG. 2, the software associated with the computing resource, and including the FFT, converts the digitized sinusoidal data 18 (represented in the digitized sinusoidal graph 32) into output data 24. The output data 24 is the digitized sinusoidal data 18 represented in numerical measurements of phase 36 data, which may be coupled with frequency data 38 and/or amplitude data 40. This output data 24 includes a more condensed quantity of information than is contained in the raw dynamic data 16 and digitized sinusoidal data 18.

The computing resource 20 including the FFT 22 transmits the output data 24 to a data packing and compression resource 42 configured for communication with the computing resource 20 via electrical, electromagnetic, or fiber-optical connection. The data packing and compression resource 42 may be a stand-alone device containing Microsoft™ compatible data packing and compression software, or it may be Microsoft™ compatible data packing and compression software associated with the computing resource 20, or a server 44, the server 44 being discussed in greater detail later on in the disclosure. Data packing and compression is a process of encoding information using fewer bits (or other information-bearing units) than an un-encoded representation would use through use of specific encoding schemes. Data packing and compression algorithms usually exploit statistical redundancy in such a way as to represent data more concisely, but completely. The data compression resource 42 of the system 10 further condenses the output data 24 from the FFT 22. The output data 24 consists of phase data 36, frequency data 38, and amplitude data 40. The data packing and compression resource 42 may transmit the output data 24 over the network 26 via at least one packet 45. In one embodiment the at least one packet 45 may include all of the output data 24, including phase, frequency, and amplitude data. In another embodiment, multiple packets 45 may be used to transmit the output data 24. Transmitting data in multiple packets separates the data into smaller units of information, decreasing unit bandwidth.

Configured for communication with the data packing and compression resource 42 (via electrical, electromagnetic, or fiber-optical connection) is the server 44 (introduced briefly above). The server 44, and its connection with the network 26, is configured to place the computer resource 20 in communication with the network 26 (via the data packing and compression resource 42), transmit the output data 24 over the network 26 to the remote computer resource 12, convert output data 24 to appropriate engineering units (such as pressure, temperature units, for example), and store the output data 24 for local retrieval (when desirable). Packing and compression of the raw dynamic data 16 into output data 24 allows information about the machine 28 that is contained in the dynamic data 16 to be represented concisely enough (and have a small enough connection bandwidth). A typical data size reduction of 1/300 is achieved through data packing and compression for efficient transmittal over the network 26. A remote server 46 associated with the remote computer resource 12 (the remote server 46 and remote computer resource 12 possibly being the same component) receives the output data 24 from the server 44 via the network 26, and may convert the output data 24 back to digitized sinusoidal graphic data 18 or raw dynamic data 16 via Microsoft compatible second or remote FFT software 48 disposed in the remote server 46. Thus, the system 10 allows for transmittal of the dynamic data 16 to the remote computer resource 12 and a remote user.

Figure 3:
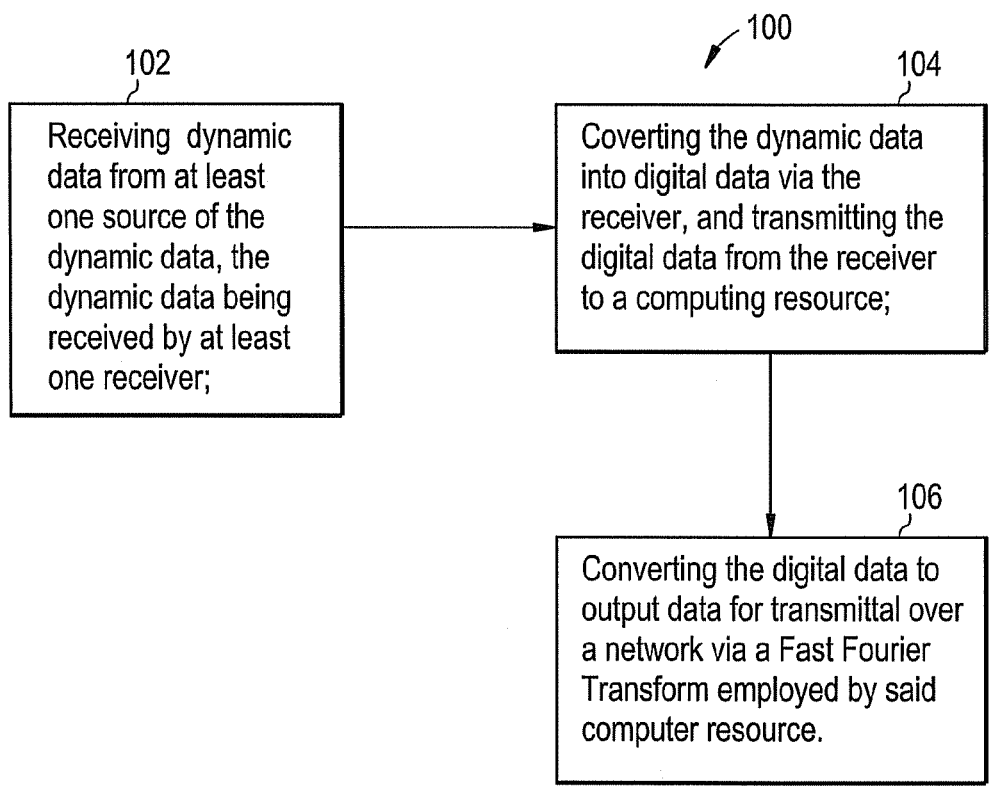
FIG. 3 is a block diagram of a method for transmitting dynamic data.

Referring to FIG. 3, a method 100 for transmitting dynamic data to a remote computer resource 12 is illustrated and includes receiving dynamic data 16 from at least one source 28 of the dynamic data 16, the dynamic data being received by at least one receiver 14, as shown in operational block 102. The method 100 also includes converting the dynamic data 16 into digitized sinusoidal data 18 via the at least one receiver 14, and transmitting the digitized sinusoidal data 18 from the at least one receiver 14 to a computing resource 20, as shown in operational block 104. The method 100 further includes converting the digitized sinusoidal data 18 to output data 24 for transmittal over a network 26 via a Fast Fourier Transform 22 employed by said computer resource 20, as shown in operational block 106.

While the embodiments of the disclosed method and apparatus have been described with reference to exemplary embodiments, it will be understood by those skilled in the art that various changes may be made and equivalents may be substituted for elements thereof without departing from the scope of the embodiments of the disclosed method and apparatus. In addition, many modifications may be made to adapt a particular situation or material to the teachings of the embodiments of the disclosed method and apparatus without departing from the essential scope thereof. Therefore, it is intended that the embodiments of the disclosed method and apparatus not be limited to the particular embodiments disclosed as the best mode contemplated for carrying out the embodiments of the disclosed method and apparatus, but that the embodiments of the disclosed method and apparatus will include all embodiments falling within the scope of the appended claims.

What is claimed is:

1. A system for transmitting dynamic data over a network to a remote computer resource, the system comprising:
   at least one receiver configured to receive dynamic data and convert said dynamic data into a digitized signal; and
   a computing resource configured for communication with the network and configured to receive said digitized signal from said at least one receiver, said computing resource configured to employ a Fast Fourier Transform to convert said digitized signal into output data that includes phase data, amplitude data, and frequency data of said digitized signal, said output data being transmittable over the network in at least one packet; and
   a data packing and compression resource configured for communication with said computing resource, said data packing and compression resource condensing said output data and providing a complete representation of said output data.

2. The system according to claim 1, further comprising a server configured for communication with said computing resource, said packing and compression resource, and the network.

3. The system according to claim 2, wherein said output data is storable in said server, and unit convertible from one engineering unit to another in said server.

4. The system according to claim 1, wherein said dynamic data is analog data.

5. The system according to claim 1, wherein said at least one packet is multiple packets including said phase data, said frequency data, and said amplitude data.

6. The system according to claim 1, wherein said at least one packet is one packet including said phase data, said frequency data, and said amplitude data.

7. The system according to claim 1, wherein at least one source is positioned to sense operating conditions of at least one machine, and configured to acquire said dynamic data, and transmit said dynamic data to said at least one receiver.

8. The system according to claim 7, wherein said at least one source comprises at least one of a sensor and a transducer.

9. The system according to claim 1, wherein the remote computer resource is configured to employ a second Fast Fourier Transform that converts said output data received from said computing resource into at least one of said digitized signal and said dynamic data.

10. The system according to claim 1, wherein said at least one receiver is an analog-digital converter.

11. The system according to claim 1, wherein said data packing and compression resource provides a data size reduction of at least 1/300.

12. A method for transmitting dynamic data over a network to a computer resource, the method comprising:
- receiving dynamic data from at least one source of dynamic data;
- converting said dynamic data into a digitized signal;
- transmitting said digitized signal to a computing resource;
- converting said digitized signal to output data via a Fast Fourier Transform, said output data including includes phase data, amplitude data, and frequency data of said digitized signal; and
- transmitting said output data in packed and compressed form over the network in at least one packet;
- wherein said packed and compressed form provides a complete representation of said output data.

13. The method according to claim 12, wherein said transmitting via at least one packet includes transmitting said phase data, said frequency data, and said amplitude data via multiple packets.

14. The method according to claim 12, wherein said transmitting via at least one packet includes transmitting said phase data, said frequency data, and said amplitude data via on packet.

15. An apparatus adapted for transmitting dynamic data over a network to a remote computer resource, the apparatus comprising:
- a machine capable of producing said dynamic data pertaining to an operating condition of said machine; and
- a system for transmitting said dynamic data over the network to the remote computer resource, the system comprising:
  - a source for obtaining said dynamic data from said machine;
  - a receiver for receiving said dynamic data from said source and converting said dynamic data into a digitized signal;
  - a computing resource configured for communication with the network and configured to receive said digitized signal from said receiver, said computing resource configured to employ a Fast Fourier Transform to convert said digitized signal into output data that includes phase data, amplitude data, and frequency data of said digitized signal, said output data being transmittable over the network in at least one packet; and
  - a data packing and compression resource configured for communication with said computing resource, said data packing and compression resource condensing said output data and providing a complete representation of said output data.

* * * * *